United States Patent [19]
Amor

[11] 3,918,423

[45] Nov. 11, 1975

[54] POLLUTION CONTROL DEVICE

[75] Inventor: Leonel da Fonseca Amor, Mozambique, Portugal

[73] Assignee: Ike Schield, Brooklyn, N.Y.

[22] Filed: Jan. 9, 1974

[21] Appl. No.: 431,692

[30] Foreign Application Priority Data
Jan. 9, 1973 Portugal.................................. 59145

[52] U.S. Cl.... 123/122 AC; 123/122 D; 123/122 A; 123/141

[51] Int. Cl.² ......................................... F02M 31/00

[58] Field of Search........ 123/122 D, 122 R, 122 A, 123/122 AC; 165/52; 123/141

[56] References Cited
UNITED STATES PATENTS

| | | | |
|---|---|---|---|
| 1,274,707 | 8/1918 | Gorman | 123/122 A |
| 2,833,261 | 5/1958 | August | 123/122 D |
| 2,846,989 | 8/1958 | Eskew | 123/122 D |
| 2,857,898 | 10/1958 | Cohn | 123/122 A |

*Primary Examiner*—Charles J. Myhre
*Assistant Examiner*—R. H. Lazarus

[57] ABSTRACT

A device for reducing toxic gases emissions of explosion and internal combustion engines while at the same time effecting a saving in fuel consumption, is disclosed. The device includes a hollow heat collector/filter unit having a plurality of air inlet openings and adapted to be mounted on the exhaust manifold in heat exchange relation therewith, a homogenizer unit defining two chambers separated by a perforated partition, of which the first chamber is adapted to be placed in communication with the outlet of the carburetor while the second chamber is adapted to be placed in communication with the intake manifold of the engine, and ducts establishing communication between the interior of the heat collector/filter unit and the second chamber of the homogenizer unit. In operation, the vacuum created by the engine pistons, sucks ambient air into the heat collector/filter unit from which the heated air travels to the homogenizer where it is intimately mixed in the second chamber with the air/fuel mixture coming from the carburetor. The final mixture thus has a greater burning capacity which will result in more fuel being burned and less carbon monoxide produced. This abstract is not to be taken either as a complete exposition or as a limitation of the present invention, however, the full nature and extent of the invention being discernible only by reference to and from the entire disclosure.

5 Claims, 6 Drawing Figures

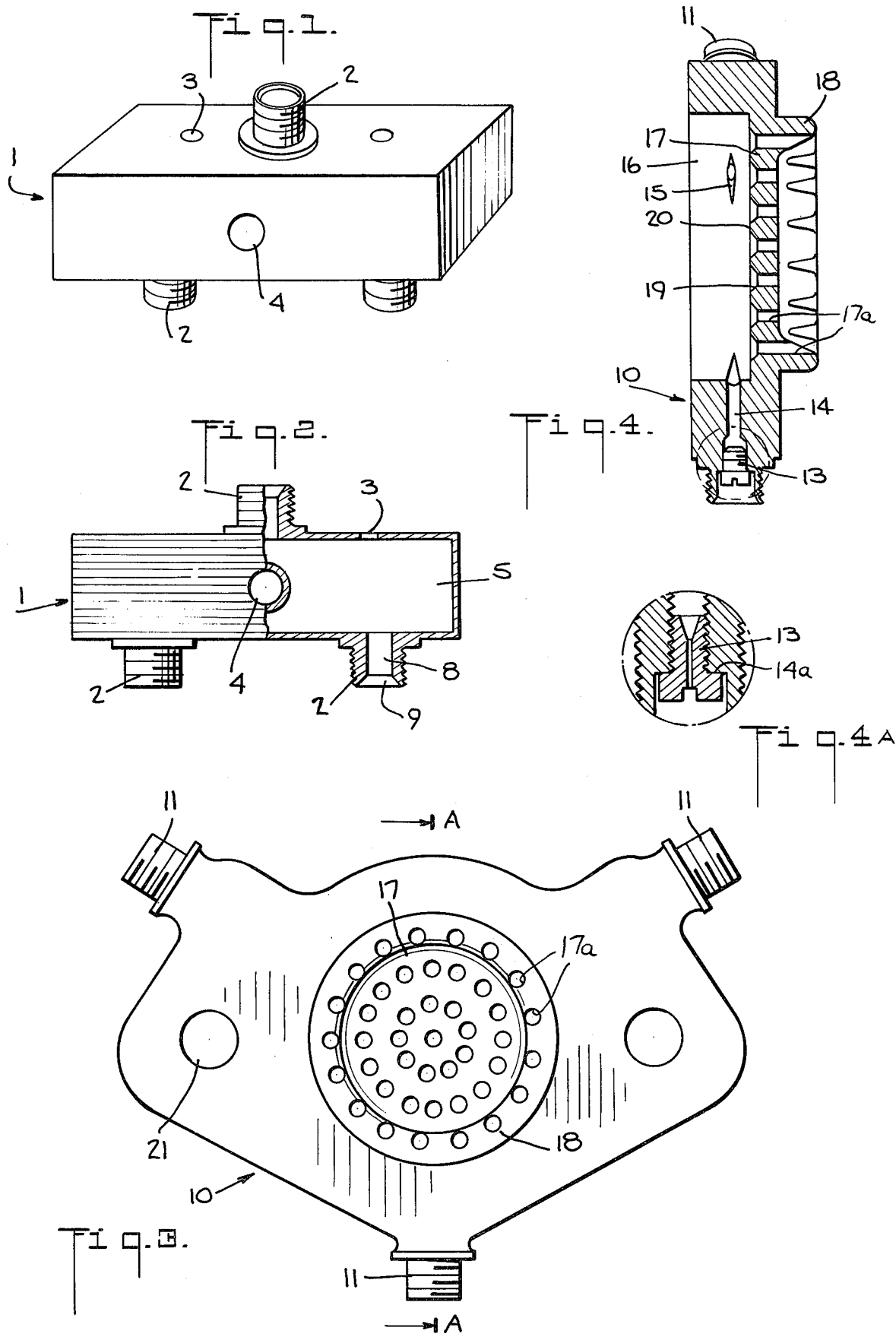

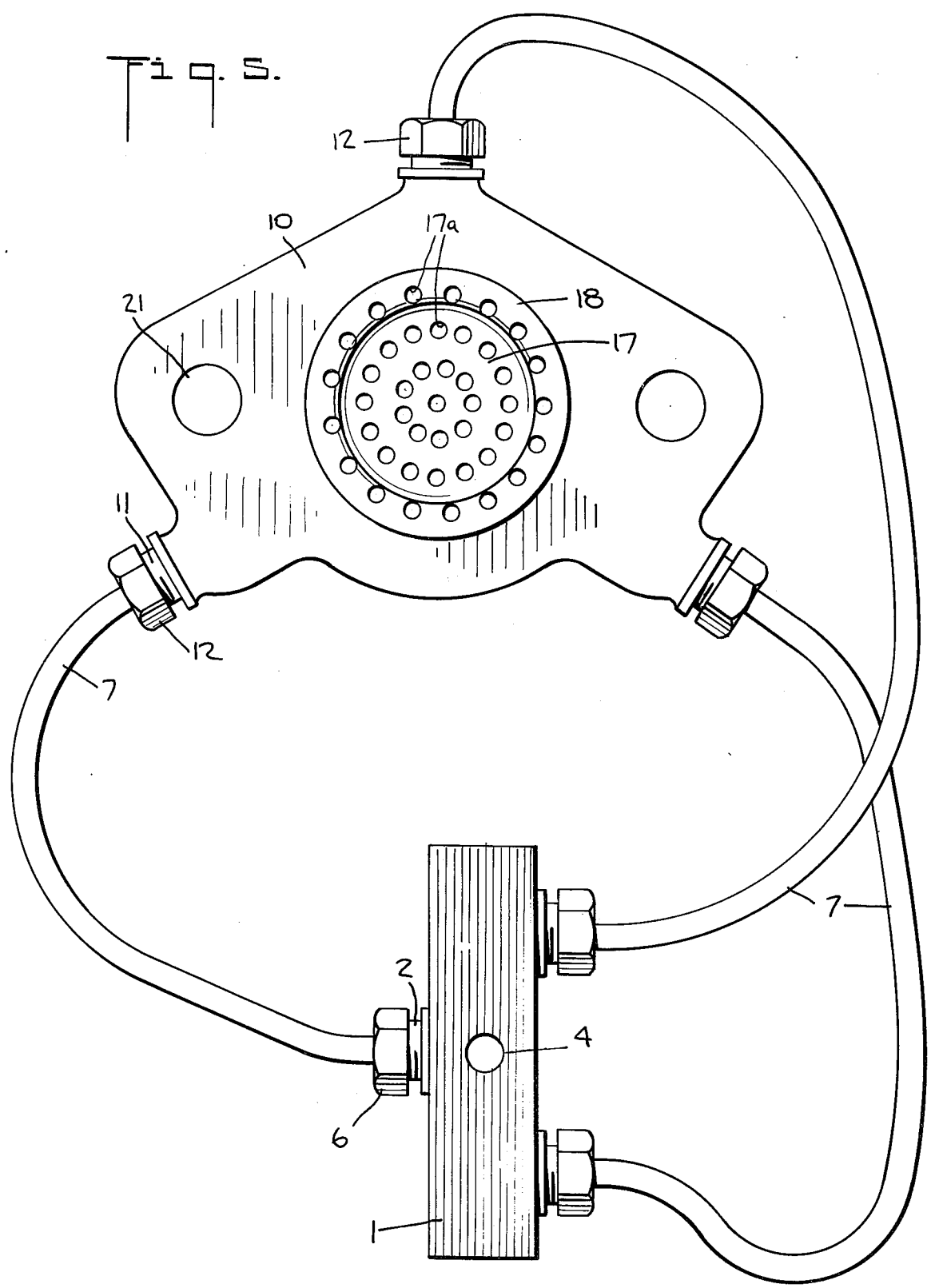

POLLUTION CONTROL DEVICE

This invention relates to non-catalytic pollution control devices suited for use in automotive vehicles.

The planet on which we live is being affected by evils that may in many cases be attributed to the growing economic and technical development of the various countries existing on it. One of these evils, and doubtless the greatest, consists of the pollution of the atmosphere, to which the extraordinary increase in the number of motor-cars, taking place everywhere, considerably contributes.

Up to a certain time, it was believed that pollution was a bugaboo invented by a few people frightened by the vertiginous advances and conquests of technology and other aspects of human life. Of late, however, people in general have become aware, thanks to constant publicity, that this problem really exists and that it has attained a dangerously high level. Nevertheless, even the seriousness of the problem has not been sufficient to overcome the innate inertia of man, and hence there has been a lag in the development of regulations and means aimed at preventing or at least attenuating pollution.

In full awareness of the gravity of this problem, and above all of the contributions made to it by the extraordinarily large number of vehicles in operation throughout the world, the genesis of the present invention has been the need for achieving an improvement in the conditions of operation of explosion and internal combustion engines, from the point of view of the reduction of the gases that are uninterruptedly expelled by the exhaust pipes of motor vehicles when in use. Among these gases, carbon monoxide (CO), the adverse effects of which on the central nervous system and on the cardiovascular system have long been known and stressed by specialists, is outstanding.

More particularly, it is an object of the present invention, to provide means for enabling a more perfect combustion of the gas mixture introduced into a motor vehicle internal combustion engine to be effected, and in such a manner that a saving in fuel is also attained concomitantly with a reduction of the carbon monoxide content of the exhaust gases.

As is well known, the air/fuel mixture effected in the carburetor is generally composed of 15 to 20 parts of air for one part of gasoline. In coventional engines, the air/fuel mixture obtained passes directly from the carburetor into the combustion chamber.

By way of contrast, in an engine equipped with the device that is the object of the present invention, the gas mixture, on leaving the carburetor, passes through a homogenizing structure provided with a sieve having multiple vertical orifices which are disposed in concentric circles and open into the upper part of a cylindrical chamber formed in the body of the said structure. The chamber has three or more orifices, regularly distributed over its periphery, through which flows air that has been previously warmed by means of heat imparted thereto by an appropriate organ or heat collector situated on or adjacent the outer wall of the exhaust manifold or the associated pipes thereof. This organ is constructed as and discharges the functions of a filter. The entry of warm air into the said chamber is made through jets or nozzles of a caliber adapted to the power of the engine and designed to guarantee the entry of a constant volume of air per time unit.

Thus, the gas mixture coming from the carburetor and after having passed through the sieve, is contacted by and combines with uniformly distributed warm air, thus becoming more homogeneous and acquiring a greater burning capacity. As a result, there is a substantial saving of gasoline, since some of that would otherwise be wasted by being only partially burned and engendering a higher production of CO.

It will be understood from the above how the device that is the object of the present invention works for the purpose of reducing the toxic gases emissions from motor exhausts as well as the gasoline saving arising from it.

With respect to the construction of the device, the heat collector is a hollow unit made of a material with a high thermal conductivity, such as aluminum, for instance, and preferably is parallelopipedal in shape. The chamber formed by the empty interior of the said unit is filled with steel wool, or any other similarly adequate material, for purposes of filtering the air sucked in (in response to movements of the pistons of the engine). The air entry is effected through two openings provided in one of the wider walls of the unit. To enable the unit to be secured to the wall of the exhaust pipe or manifold, a hollow tubular clampreceiving fitting is provided on one of the narrower walls of the body of the unit.

For vehicles having more than one carburetor, of course, there may be either a heat collector for each carburetor or a single collector of adequate dimensions for all carburetors.

To conduct air sucked into the heat collector away from the latter after the air has been heated by virtue of the contact of the heat collector with the hot surface of the exhaust pipe or manifold, three or more tubes are provided, each one of which is tightly coupled at one end, by means of nuts or like fastening elements, to a corresponding externally threaded hollow fitting provided on the unit. The other end of each tube is tightly connected by means of a nut or the like to a corresponding externally threaded hollow fitting provided on the homogenizer, the latter being mounted between the carburetor outlet and the entry to the intake manifold. Each of the fittings on the homogenizer is provided in its bore with a shoulder or seat and is internally threaded along the portion of the bore inward of the shoulder to enable an injector or nozzle member to be screwed thereinto. Through this arrangement, therefore, these injectors can be withdrawn for purposes of substitution or replacement and to make it possible for the device to be manufactured for use with various injector calibers, depending on the power of the engine with which it is to be used.

On the upper surface of the homogenizer, which is connected to the outlet of the carburetor, there is provided a sievelike structure, preferably an arrangement of apertures in plural concentric circular rows, bounded by an annular peripheral wall having an adequate profile for the suitable conduction of the gas mixture sucked in through the sieve holes by means of the movement of the engine pistons. The lower surface of the sieve, which, when in use, constitutes the upper wall of a chamber, is formed with a plurality of circular profile grooves corresponding to the rows of apertures and each communicating with the bottom ends of a respective row of apertures, and a plurality of circular lands constituting the zones separating the said grooves.

The cylindrical bore that extends from the outlet of each nozzle member toward the region of the sieve portion of the homogenizer, terminates in an elongated, somewhat oval or fan-shaped, horizontal opening in the cylindrical side boundary wall of the aforesaid chamber that is topped by the sieve, so as to make it possible to carry out a perfect homogenization of the hot air with the gas mixture as a complement of the remaining characteristics of the homogenizer already mentioned and relating to its shape and constitution, in order to obtain the results of reducing the toxic exhaust gases and saving fuel, obtained by the application of the device that is the object of the present invention.

A device according to the present invention and having the characteristics hereinbefore outlined, has been shown, in actual tests to which the said device was submitted in the chemical laboratories of the University of Lourenco Marques and of the South African Bureau of Standards of Pretoria, South Africa, to enable a reduction of CO on the order of 80% to be obtained when the motor of the vehicle is working at a low rotation rate, and the vehicle is either stationary or moving at a speed of less than 50 km./h., which corresponds very approximately to the most frequent occurrences in the case of vehicles operated in cities. The device thus will function best, from an anti-pollution point of view, precisely in urban areas where this benefit is most necessary. At the same time, the decrease in the consumption of gasoline is found to vary within a range of 10 to 30 percent.

For a perfect understanding of what has been said hereinbefore as to the constitution of the device according to the present invention and of the procedure of using it, the attached drawings will shown the most advisable method of implementing the invention, as an example and without any character of limitation, for the most frequently occuring case which is that of an engine with a single carburetor. In the drawings:

FIG. 1 is a perspective view of the heat collector/air filter component of the device according to the present invention;

FIG. 2 is a partly elevational and partly sectional view of the structure shown in FIG. 1;

FIG. 3 is a plan view of the homogenizer unit of the device for the mixing of the hot air and the gas mixture;

FIG. 4 is a sectional view taken along the line A—A in FIG. 3;

FIG. 4A is an enlarged view of the circled portion of the structure shown in FIG. 4; and FIG. 5 is an overall plan view of the device, showing the heat collector and the homogenizer interconnected by means of tubes or pipes for the conduction of hot air from the former to the latter.

Referring now to the drawings in greater detail, the device according to the present invention comprises a heat collector 1 (see FIGS. 1 and 2), shown in the form of a hollow structure of parallelepipedal shape. The structure is provided with externally threaded tubular fittings 2 on the outside to which respective tubes or pipes 7 for the conduction of hot air are connected by means of nuts 6 (see FIG. 5). To enable entry of outside air into the heat collector 1, the latter is provided with a plurality of openings or holes 3. The sucking in, as will be apparent, is caused by the movement of the pistons in the engine of the vehicle. The air sucked in is heated by the heat imparted to the structure 1 by virtue of the latter being secured, in heat exchange relation, to the wall of the exhaust pipe, for example by means of a hollow tubular stud 4 adapted to receive a clamp, a pin or a screw (not shown).

The inside of the structure 1 is filled with steel wool or any other adequate material for purposes of filtering the air sucked in.

The bore 8 of each of the fittings 2, is provided at its outermost end with a conical seat 9 intended to receive one end of the associated conducting pipe 7.

The homogenizer 10 (FIGS. 3 and 4) includes externally threaded fittings 11 to which the other ends of the pipes 7 are connected by means of nuts 12. In each fitting 11, the bore 14 thereof has an outwardly facing seat or shoulder 14a and is internally threaded inwardly of the shoulder, and an externally threaded injector or nozzle member 13, of a caliber or internal diameter adapted to the power of the engine, is screwed into the bore. The member 13 is shown in cross-section in enlarged detail in FIG. 4A.

The bore 14, which is an extension of the outlet of the injector or nozzle member 13 mounted therein, terminates in a generally oval, fan-shaped, opening 15 disposed horizontally on the cylindrical side wall of a chamber 16 located under a sieve 17 defined by a web portion having formed therein a plurality of apertures 17a arranged in concentric circular rows. At its upper surface, the sieve is bounded by a peripheral annular wall 18 made in such a way as to conduct in the most suitable manner, i.e. without interference with the flow, the gas mixture sucked in by the movement of the pistons. At its lower surface, the sieve has a plurality of circular grooves 19 each in profile in the shape of a half-reed, each groove corresponding to a respective one of the zones of the sieve apertures 17a and communicating with the bottom ends of the latter, and the grooves being separated by lands or ridges 20, also circular and with the same profile.

In use, the homogenizer is arranged with the space above the sieve 17 and surrounded by the wall 18 in communication with the carburetor outlet, and with the space or chamber 16 below the sieve in communication with the intake manifold of the engine. To mount the homogenizer in place, two holes 21 are provided in the body of the homogenizer 10 through the which bolts or other fastening accessories (not shown) can be fitted.

It will be understood, therefore, that the sieve 17 causes the gas or air/fuel mixture from the carburetor to be divided in a perfect and uniform manner on entering into the homogenization chamber 16, and that the hot air which is to be combined with the said mixture, enters the same chamber in quantities that are uniform per unit of time, i.e. at uniform volume flow rates, owing to the caliber of the nozzle or throttle members 13, but vary according to the functioning of the engine. By virtue of the fan-shaped openings 15 at the innermost ends of the bores 14 and the equidistant distribution of the same peripherally along the wall of the chamber 16, the heated air from the heat collector/filter unit 1 enters the chamber 16 in a horizontal spreading flow and is thus homogeneously admixed with the air/fuel mixture, whereby a greater burning capacity is achieved than would otherwise be the case. As a result, a high reduction of the toxic gases emissions from the exhaust is attained as well as a saving in fuel, both of which will thus contribute to an improvement in the air quality in a very efficient manner.

It will be understood that the foregoing description of a preferred embodiment of the present invention is for purposes of illustration only, and that the various structural and operational features herein disclosed are susceptible to a number of modifications and changes none of which entails any departure from the spirit and scope of the present invention as defined in the hereto appended claims.

What is claimed is:

1. A device for reducing toxic gases emissions from the exhaust of explosion and internal combustion engines and for reducing fuel consumption, comprising
   a. a heat collector adapted to be mounted in heat exchange relation to the outer wall of the exhaust pipe or manifold of an engine,
   b. a homogenizer adapted to be in communication with the outlet of a carburetor and the intake manifold of the engine, and
   c. duct means including a plurality of tubes and fittings connected to and for establishing communication between said heat collector and said homogenizer,
   d. said homogenizer including a housing having therein
      i. a first chamber adapted to be placed into direct communication with the carburetor outlet,
      ii. a second chamber adapted to be placed into direct communication with the intake manifold of the engine, and
      iii. a perforated partition interposed between said chambers for effecting a distribution of the air/fuel mixture through said second chamber,
      iv. said partition being a sieve-like structure having multiple apertures therein arranged in a plurality of concentric circular rows,
      v. said partition being provided on the surface thereof facing said second chamber with a plurality of concentric circular grooves separated by intermediate lands,
      vi. each of said grooves being aligned with a respective row of said apertures and in communication with all the apertures of that row,
      vii. the width of each groove increasing gradually in the direction away from its juncture with the associated apertures,
      viii. said housing being further provided with a plurality of passageways each extending from its juncture with a respective one of said tubes to said second chamber and terminating thereat in a generally oval, transversely oriented inlet opening,
      ix. said inlet openings being equidistantly spaced from one another peripherally of said second chamber, and
      x. said housing being further provided with a nozzle or throttle member in each of said passageways for regulating the entry of heated air into said second chamber to a predetermined volume rate of flow, and
   e. said heat collector being a hollow structure filled with a fibrous air-filtering material and provided with at least one air admission opening through which ambient air can be drawn into the heat collector as a function of the vacuum created by the movement of the pistons of the engine and applied to the interior of said hollow structure via said duct means,
   f. whereby the air, after being heated in said heat collector, can enter said second chamber of said housing of said homogenizer and there come into intimate admixture with the air/fuel mixture entering said second chamber from the carburetor via said first chamber and said partition, so as to impart to said mixture a greater burning capacity resulting in both a substantial reduction of toxic gases emissions from the engine as well as in savings of fuel.

2. A device according to claim 1, wherein said nozzle or throttle members are removably inserted in said passageways for replaceability by nozzle or throttle members of different calibers or bore diameters.

3. A device according to claim 1, wherein said heat collector is made of a material having a high thermal conductivity.

4. A device according to claim 3, wherein said homogenizer is made of synthetic plastic material.

5. A device according to claim 1, further comprising a plurality of additional homogenizers each adapted to be in communication with a respective one of a plurality of carburetors of a multi-carburetor engine, and respective duct means establishing communication between said heat collector and each of said homogenizers.

* * * * *